US005262215A

United States Patent [19]

Shields

[11] Patent Number: 5,262,215
[45] Date of Patent: Nov. 16, 1993

[54] LAMINATED ARTICLE FOR HAVING SEPARABLE PIECES FOR DETACHABLE PLACEMENT ON A BACKGROUND

[75] Inventor: William A. Shields, Kansas City, Mo.
[73] Assignee: Package Service Company, Kansas City, Mo.

[21] Appl. No.: 901,192
[22] Filed: Jun. 19, 1992
[51] Int. Cl.[5] .......... B32B 3/16; B41M 3/12
[52] U.S. Cl. .......... 428/40; 428/41; 428/42; 428/16; 428/192; 428/194; 434/97; 434/155; 446/27
[58] Field of Search .......... 428/40, 41, 42, 192, 428/194, 16; 434/97, 155; 446/27

[56] References Cited

U.S. PATENT DOCUMENTS

| | | | |
|---|---|---|---|
| 2,093,207 | 9/1937 | Munson, Jr. | 446/98 |
| 2,592,078 | 4/1952 | Taylor et al. | 446/100 |
| 3,130,984 | 4/1964 | Fenberg | 283/117 |
| 3,274,706 | 9/1966 | Friend | 428/21 |
| 3,466,217 | 9/1969 | Mott | 428/41 |
| 4,310,137 | 1/1982 | Frye | 428/40 |
| 4,348,454 | 9/1982 | Eckberg | 428/40 |
| 4,489,154 | 12/1984 | Taylor | 428/40 |
| 4,652,239 | 3/1987 | Brimberg | 428/41 |
| 4,714,275 | 12/1987 | Engel et al. | 281/15.1 |
| 4,747,619 | 5/1988 | Sager | 283/81 |
| 4,776,914 | 10/1988 | Horikiri | 446/901 |
| 4,783,350 | 11/1988 | DeMatteo | 428/43 |
| 4,789,187 | 12/1988 | Curlew et al. | 428/40 |
| 4,841,712 | 6/1989 | Roou | 53/412 |
| 4,980,212 | 12/1990 | Marquis et al. | 428/40 |
| 5,021,275 | 6/1991 | Kim | 428/40 |

FOREIGN PATENT DOCUMENTS

| | | | |
|---|---|---|---|
| 1137088 | 12/1968 | United Kingdom | 434/155 |

*Primary Examiner*—Ellis P. Robinson
*Assistant Examiner*—Nasser Ahmad
*Attorney, Agent, or Firm*—Hovey, Williams, Timmons & Collins

[57] ABSTRACT

A laminated article includes a web releasably adhered to a carrier sheet having indicia imprinted thereon. The web includes a die cut top layer having indicia-imprinted separable pieces releasably adhered to a support layer. Upon separating the web from the carrier sheet, selected ones of the separable pieces can be releasably attached to the carrier whereby the respective indicia cooperate for the playing of a game or creation of a scene.

8 Claims, 1 Drawing Sheet

************
THE GREAT
STICKER
 GAME 
************
* LET'S *
SAVE FACE

LAMINATED ARTICLE FOR HAVING SEPARABLE PIECES FOR DETACHABLE PLACEMENT ON A BACKGROUND

BACKGROUND OF THE INVENTION

1. Field of the Invention

The present invention relates to the field of laminated articles. More particularly, the invention hereof concerns a laminated article and method of manufacture in which the article includes a web releasably adhered to a carrier sheet having indicia imprinted thereon. The web includes a die cut top layer having indicia-imprinted separable pieces releasably adhered to a support layer.

2. Description of the Prior Art

The prior art includes educational or amusement devices having a plurality of figures or pieces cut from a sheet of vinyl and which can be selectively arranged on a release-coated background. Due to the nature of the vinyl material, these pieces cling to the background yet can be removed or rearranged.

In other prior art devices, a storybook or album includes pages having sequentially numbered boxes corresponding in size and number to self-adhesive stickers which are purchased separately from the album. Placement of these stickers integrates with the story line presented by the album. The structure and manufacturing cost of these prior art devices have prevented wide distribution as free novelty items in cereal boxes and snack food packages, for example.

SUMMARY OF THE INVENTION

The present invention solves the prior art problems outlined above and provides a distinct advance in the state of the art. More particularly, the laminated article hereof presents a practical structure which allows economical manufacture.

Broadly, the preferred laminated article includes a web adhesively and detachably coupled with a carrier sheet. The web includes a support layer and a top layer releasably adhered thereto configured to present a plurality of separable pieces.

The preferred carrier and pieces are imprinted with cooperating indicia for playing a game or creating a scene. Additionally, a dry release adhesive is preferably used to adhere the respective marginal zones of the web and carrier.

DETAILED DESCRIPTION OF THE PREFERRED EMBODIMENT

Figures 1, 2, 3, 4, 5, 6:
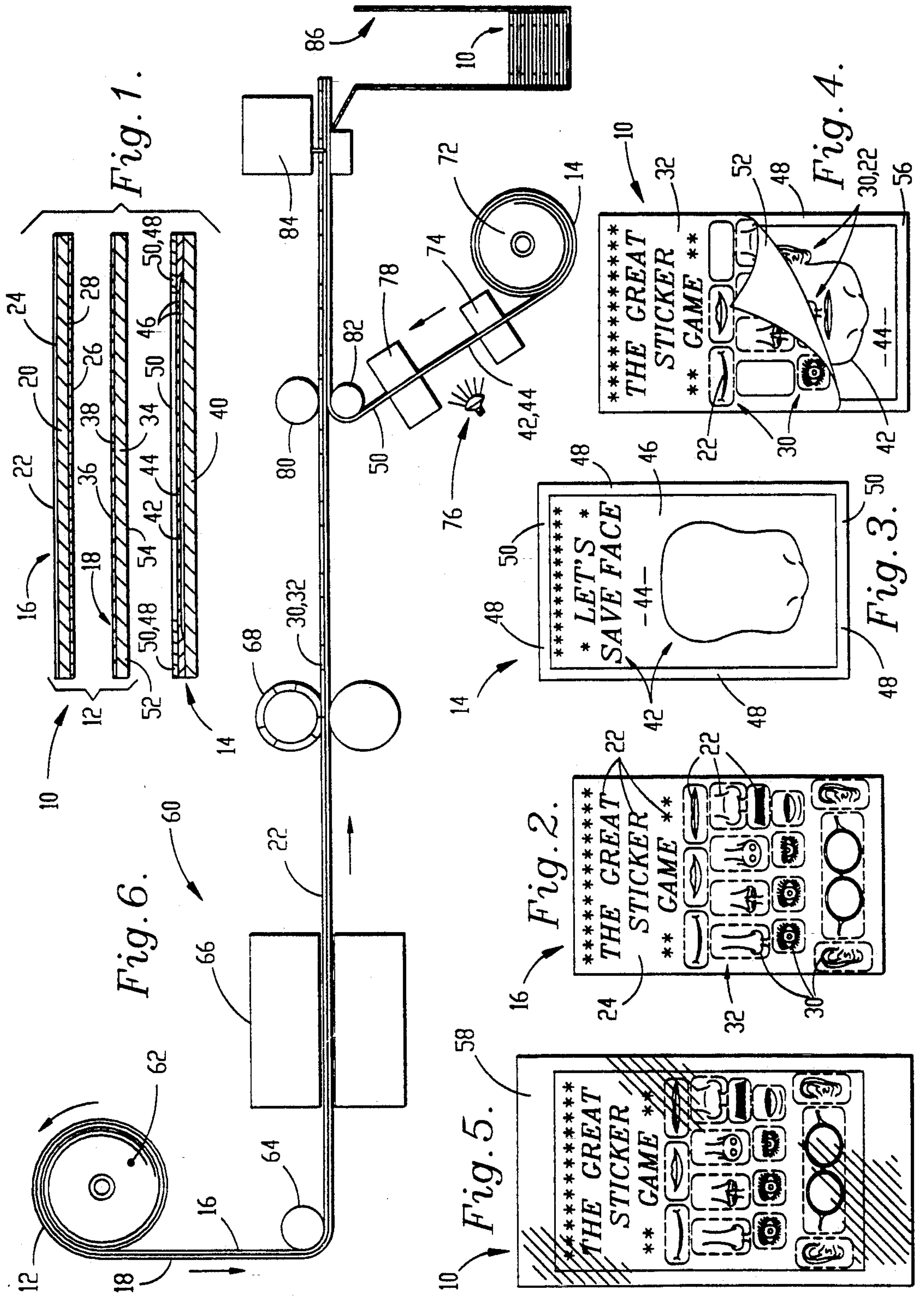
FIG. 1 is an exploded sectional view of the preferred laminated article of the present invention.
FIG. 2 is a plan view of the article of FIG. 1.
FIG. 3 is a plan view of the preferred carrier sheet of the article.
FIG. 4 is a plan view of the article of FIG. 2 with the web thereof partially detached from the carrier.
FIG. 5 is a plan view of the preferred article enclosed in a protective pouch.
FIG. 6 is a schematic representation of the preferred label manufacturing machine used for producing the article of the present invention.

FIGS. 1–5 illustrate the preferred laminated article 10 which presents a rectangular configuration in plan view and is preferably configured about the size of a baseball trading card. Article 10 includes web 12 and carrier sheet 14 with web 12 further including top layer 16 and support layer 18.

Top layer 16 includes top sheet 20 composed of paper having indicia 22 imprinted on top surface 24 thereof and also includes low tack, semi-permanent, pressure sensitive adhesive 26 on bottom surface 28 thereof. Additionally, top layer 16 is preferably die cut in order to present a plurality of separable "stickers" or pieces 30 within matrix 32. Indicia 22 are configured in a manner to cooperate with indicia imprinted on carrier sheet 14. More particularly, pieces 30 form an exemplary illustration, as best seen in FIG. 4, representing humorous facial features for cooperative placement on the corresponding facial outline seen as the indicia 42 imprinted on carrier sheet 14. As can be appreciated, the present invention encompasses a wide variety of indicia for pieces 30 and sheet 14 which can include, for example, game components for tic-tac-toe or checkers, or components to create a scene in cooperation with indicia on sheet 14.

Support layer 18 is preferably forty pound release paper and includes support sheet 34 composed of paper having release coating 36 on upper surface 38 thereof. Adhesive 26 releasably adheres bottom surface 28 and thereby top layer 16 to upper surface 38 of support layer 18. The presence of release coating 36 allows selective detachment of pieces 30 from support layer 18 and the nature of adhesive 26 allows selective reattachment of pieces 30 to layer 18.

Carrier sheet 14 is preferably composed of paper board stock 40 coated one side (C1S) with solid bleached sulfate (SBS) and having indicia 42 imprinted thereon. Furthermore, carrier sheet 14 includes coating 44 of ultraviolet treatable silicone release compound on upper face 46 for releasable adherence of selected ones of pieces 30 thereon. As illustrated in FIG. 3, indicia 42 present the outline of a head and cooperate with pieces 30 for creating the image or scene of a humorous face.

Upper face 46 presents marginal zone 48 adjacent the periphery thereof which includes dry release adhesive 50 thereon composed of water based polyvinyl acetate. Adhesive 50 couples corresponding marginal zone 52 of support sheet lower surface 54 with marginal zone 48 and thereby couples web 12 with carrier sheet 14. Marginal zone 48 further includes adhesive free area 56 in the lower right corner thereof (FIGS. 3 and 4) which allows a user to grasp the corresponding lower right corner of web 12 for removal thereof from carrier sheet 14.

FIG. 5 illustrates article 10 enclosed in protective pouch 58 which is preferably constructed in the manner illustrated in U.S. Pat. No. 4,841,712 hereby incorporated by reference, although, conventional enclosure in a cellophane packet may be preferable in some circumstances. Pouch 58 is desirable when article 10 is to be included in a food package.

FIG. 6 is a schematic representation of a label manufacturing machine 60 such as the Webtron 650 manufactured by Webtron, Inc. of Fort Lauderdale, Fla. Machine 60 is the apparatus of choice for producing article 10 and for implementing the method of the present invention, although, those skilled in the art will appreciate that other functionally equivalent machines can be used.

Machine 60 includes web dispensing reel 62, web guide roller 64, conventional ink press or flex-o-graphic printer 66, die cutter 68, anvil roller 70, carrier dispensing reel 72, printing and coating station 74, ultraviolet lamp 76, dry release adhesive press 78, laminating rollers 80 and 82, cutter 84, and collection rack 86. In operation, reel 62 holds continuously elongated web 12. As preferably purchased web 12 includes top layer 16 and support layer 18. Reel 62 dispenses web 12 which travels by way of guide roller 64 into printer 66 which imprints indicia 22 on top sheet 20. Die cutter 68 then cuts top sheet 20 to create sets of pieces 30 and matrix 32.

Dispensing reel 72 dispenses an elongated roll of carrier sheet 14 which passes initially through printing and coating station 74. This station imprints indicia 42 on upper face 46 of board stock 40 and also applies silicone release coating 44 to upper face 46; lamp 76 then cures coating 44. Next, press 78 applies dry release adhesive 50 to marginal zone 48 of upper face 46.

Carrier sheet 14 then travels to rollers 80,82 which bring web 12 and carrier sheet 14 into contact so that adhesive 50 adheres web 12 to carrier sheet 14 at zones 48,52. In this manner, rollers 80,82 bring web 12 and sheet 14 into superposed relationship so that the sets of pieces 30 are in correspondence, that is, in registration with indicia 42 of carrier sheet 14 thereby forming a continuous length of articles 10. At this point, a continuous roll can be formed if desired, or cutter 84 can be used to cut web 12 and carrier sheet 14 in order to separate articles 10 for individual collection in rack 86.

In use, article 10 is first removed from pouch 58 if such is provided. The user can then grasp the lower left corner of web 12 pulling upwardly to detach it from carrier sheet 14 and to expose carrier upper face 46 and thereby indicia 42. As can be appreciated, web 12 can be completely removed from sheet 14 or can be left with the upper portions of zones 48,52 remaining adhered.

The user can then remove selected pieces 30 by peeling them from support sheet 34. As can be appreciated, even though pieces 30 include adhesive 26, release coating 36 on support sheet 34 allows removal and replacement. The user can then place pieces 30 on carrier sheet 14 to create a desired scene or, as illustrated in FIGS. 2-4, a funny face. Carrier release coating 44 allows selected pieces 30 to be detached and replaced on support sheet 34 whereupon different pieces 30 can be selected to create a different configuration of the funny face on carrier 14.

As those skilled in the art will appreciate, the present invention encompasses many variations in the preferred embodiment described herein. For example, the web could be adhered to the lower face of the carrier sheet or it could be adhered along the entire surface thereof rather than just at the preferred zones. Additionally, the top sheet could be cut to present adjacent pieces so that a matrix is not formed. Additionally, article 10 could be configured to present a wide variety of retail promotions such as sweepstakes, give-away games and the like. For example, in a sweepstakes promotion, the web can hide the indicia on the carrier to prevent premature disclosure of contest results such as with a lottery game piece. As a final example, it may be desirable that carrier 14 not include a release coating so that pieces placed thereon remain permanently adhered.

Having thus described the preferred embodiment of the present invention, the following is claimed as new and desired to be secured by Letters Patent:

I claim:

1. A laminated article of manufacture comprising: a web including a support layer presenting an upper surface having a release coating thereon, and a top layer presenting a lower surface and configured to include at least one separable piece, said lower surface including low tack, semi-permanent pressure sensitive adhesive thereon releasably adhering said surface, for allowing selective removal of said piece therefrom;

a carrier sheet presenting an upper face having a release coating and for placement of said piece thereon; and a dry release adhesive means along a marginal zone adjacent the periphery of said carrier sheet upper surface, for adhesively and detachably coupling said web and carrier sheet in a superposed relationship and creating a releasable bond therebetween, said bond preventing separation of said web and carrier sheet in a manner precluding access to said carrier sheet upper face for application of said piece thereto until at least partial release of said bond allows separation of said web and said carrier sheet sufficient for application of said piece to said upper surface.

2. The article as set forth in claim 1, said piece and carrier sheet upper face including indicia printed thereon, said piece, upper face and indicia being cooperable for playing a game.

3. The article as set forth in claim 2, said upper face including indicia representative of a game board, said pieces including indicia representative of game pieces cooperable with said game board for playing said game.

4. The article as set forth in claim 1, said piece and carrier sheet upper face including indicia printed thereon, said piece, upper face and indicia being cooperable for creating a scene.

5. The article as set forth in claim 4, said upper face including indicia representative of a background for a scene, said pieces including indicia representative of foreground for a scene.

6. The article as set forth in claim 1, further including a protective pouch enclosing said web and carrier sheet.

7. The article as set forth in claim 1, said carrier sheet release coating including an ultraviolet treatable silicone compound, and said dry release adhesive including a water based polyvinyl acetate.

8. A laminated article of manufacture comprising: a web including a support layer presenting an upper surface, said upper surface having a release coating thereon, and a top layer presenting a top surface and a lower surface, said top layer configured to include at least one separable piece and a matrix, said lower surface low tack, semi-permanent pressure sensitive including adhesive thereon releasably adhering said top layer to said support layer upper surface for allowing selective removal of said piece therefrom, said top surface including indicia printed thereon;

a carrier sheet presenting an upper face for placement of said piece thereon, said upper face including indicia printed thereon and a carrier release coating, said carrier sheet indicia cooperating with said top layer indicia for entertainment purposes; and dry release adhesive means adhesively and detachably coupling said web and carrier sheet in a superposed relationship and creating a releasable bond therebetween, said bond preventing separation of said web and carrier sheet in a manner precluding access to said carrier sheet upper face for application of said piece thereto until at least partial release of said bond allows separation of said web and said web and said carrier sheet sufficient for application of said piece to said upper surface, said web and said carrier sheet including marginal zones having contact with said dry release adhesive means.

* * * * *